2 Sheets--Sheet 1.

J. & G. ARMSTRONG.
Gang-Plows.

No. 155,134. Patented Sept. 22, 1874.

Witnesses:
H. K. Du Hamel
Thomas Byrne

Inventor.
James Armstrong
George Armstrong
Per H. S. Abbot
Attorney

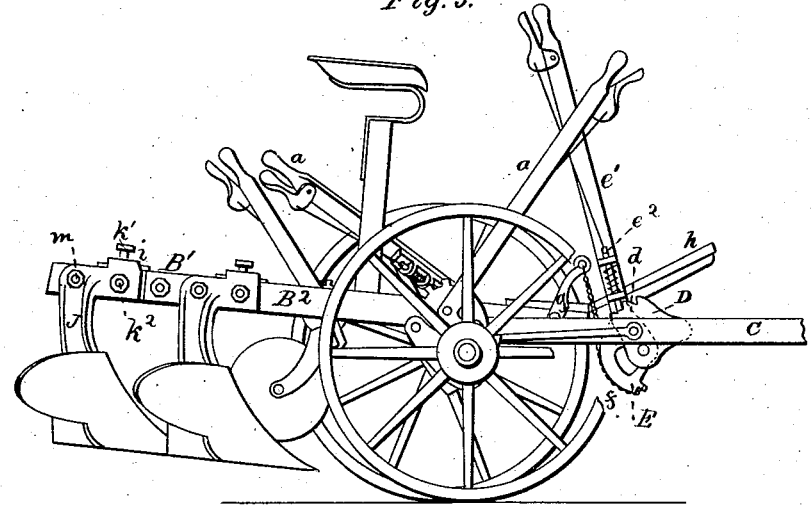

UNITED STATES PATENT OFFICE.

JAMES ARMSTRONG AND GEORGE ARMSTRONG, OF ELMIRA, ILLINOIS.

IMPROVEMENT IN GANG-PLOWS.

Specification forming part of Letters Patent No. 155,134, dated September 22, 1874; application filed December 22, 1873.

*To all whom it may concern:*

Be it known that we, JAMES ARMSTRONG and GEORGE ARMSTRONG, of Elmira, in the county of Stark and State of Illinois, have invented certain new and useful Improvements in Gang-Plows, of which the following is a specification:

Our invention relates to certain improvements on that for which Letters Patent No. 130,177 were granted to us August 6, 1872, and relates to the hereinafter-described improvements in gang-plows.

Figure 1:
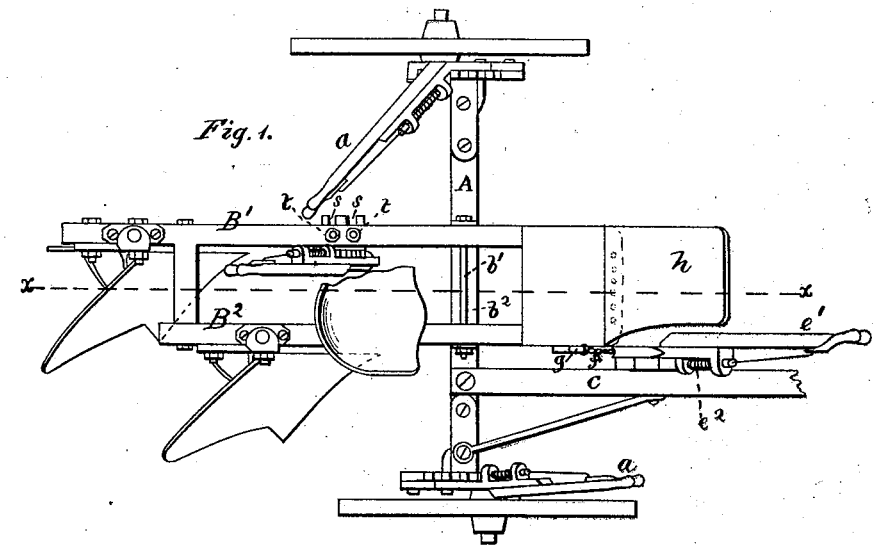
Figure 3:
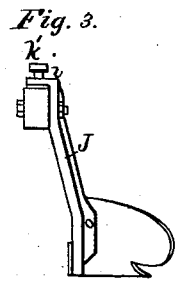
Figure 4:
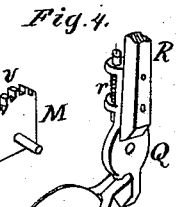
Figure 2:
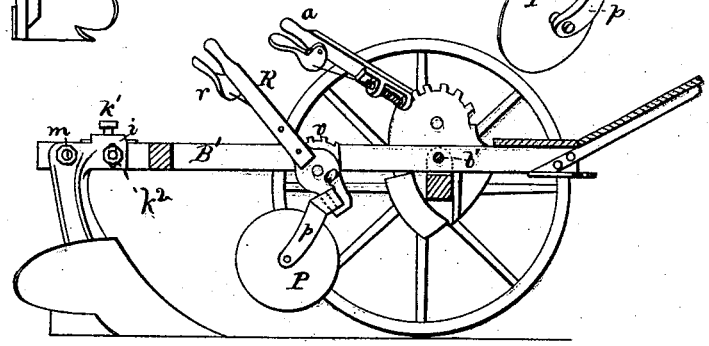

In the accompanying drawings, Figure 1 is a plan or top view of our improved gang-plow. Fig. 2 is a longitudinal central vertical section. Fig. 3 is a rear view of the beam, standard, and plow. Fig. 4 is a perspective view of the colter and its attaching and operating devices. Fig. 5 is a side view, showing the plows elevated from the ground.

A is the axle-tree, provided with hand-levers $a\ a$ for raising and lowering it, to regulate the depth of plowing, arranged and operating as in the invention described in our Letters Patent No. 130,177 aforesaid. The plow-beams $B^1\ B^2$ are hinged to the axle-tree by means of a rod, $b^1$, passing through them and through lugs formed by turning up the ends of a bar, $b^2$, secured to the upper side of the axle-tree. On one of the vertical sides of the tongue C a metallic plate, D, is secured, having teeth or notches $d$ on its upper edge. Pivoted to the plate D is a sector, E, with a groove formed on its curved edge, and having a hand-lever, $e^1$, attached, said hand-lever being provided with a spring-bolt, $e^2$, for engagement with the teeth or notches $d$ on the plate D. A cord or chain, $f$, connects the sector E with an arm, $g$, attached to the plow-beam $B^2$. (See Fig. 5.) When it is desired to elevate the plows from the ground, the driver grasps the hand-lever $e^1$ and moves it toward the rear of the machine, and at the same time presses with his feet upon the platform or foot-board $h$ on the front end of the beam, which has the effect of depressing the front end of the beam and elevating the rear end, thus raising the plows clear of the ground, as shown in Fig. 5, in which position they are locked by the spring-bolt $e^2$ engaging with one of the notches $d$. The plow shank or standard J is bent off toward one side, as shown in Fig. 3, instead of having the plow located directly underneath the beam in the ordinary manner. By this arrangement the trash and weeds are thrown aside, instead of collecting in bunches under the plow-beam. The plow-standard J is formed with a cap or flange, $i$, at its upper end, turned over so as to rest upon the upper side of the plow-beam. Through this cap or flange passes a set-screw, $k$, which bears upon a plate, $l$, on said plow-beam. By turning this set-screw (the rear portion of the upper end of the standard being pivoted at $m$ to the beam) the point of the plow is raised or lowered to regulate the angle of inclination at which the plow enters the ground, and is held in the desired position by a screw, $k^2$, bearing against the vertical side of the beam. M represents a metallic plate forming two sides of a square, corresponding with the bottom and one of the vertical sides of the plow-beam. The horizontal portion is formed with two slots, $s\ s$, through which pass two bolts, $t\ t$, by which it is secured to the under side of the beam. By means of these slots and bolts the plate M is readily moved to the right or left, for the lateral adjustment of the colter attached thereto. The colter consists of a thin disk or cutting-wheel, P, connected by a forked arm, $p$, to the lower end of a plate or bar, Q, so as to admit of a swivel motion. The bar Q is pivoted to the vertical side of the plate M, (see Fig. 2,) so as to admit of a vertical reciprocating motion in an arc of a circle. A hand-lever, R, is attached to the bar Q for raising and lowering it, said lever being provided with a spring-bolt, $r$, for engagement with notches $v$ in the upper edge of the vertical side of the plate M. By means of the hand-lever R the colter may be instantly raised or lowered, at the pleasure of the driver, and by means of the spring-bolt $r$ and notches $v$ it is locked at any desired height.

What we claim as new, and desire to secure by Letters Patent, is—

1. The combination of the notched plate D, attached to the tongue, the spring-bolt $e^2$, hand-lever $e^1$, grooved sector E, chain $f$, and arm $g$, attached to front of plow-frame, for elevating the plows from the ground, substantially as shown and described.

2. The casting M, provided with slots $s\ s$ and notched segment $v$, substantially as shown and described, for the attachment and ready adjustment of the colter by means of levers.

3. In combination with the plate M, constructed as described, the colter P, pivoted bar Q, and hand-lever R, all arranged and operating substantially as shown and described.

In testimony that we claim the foregoing as our invention, we hereunto affix our signatures this 17th day of December, 1873.

JAMES ARMSTRONG.
GEORGE ARMSTRONG.

Witnesses:
DAVID J. WALKER,
JAMES H. MILLER.